Patented Sept. 25, 1928.

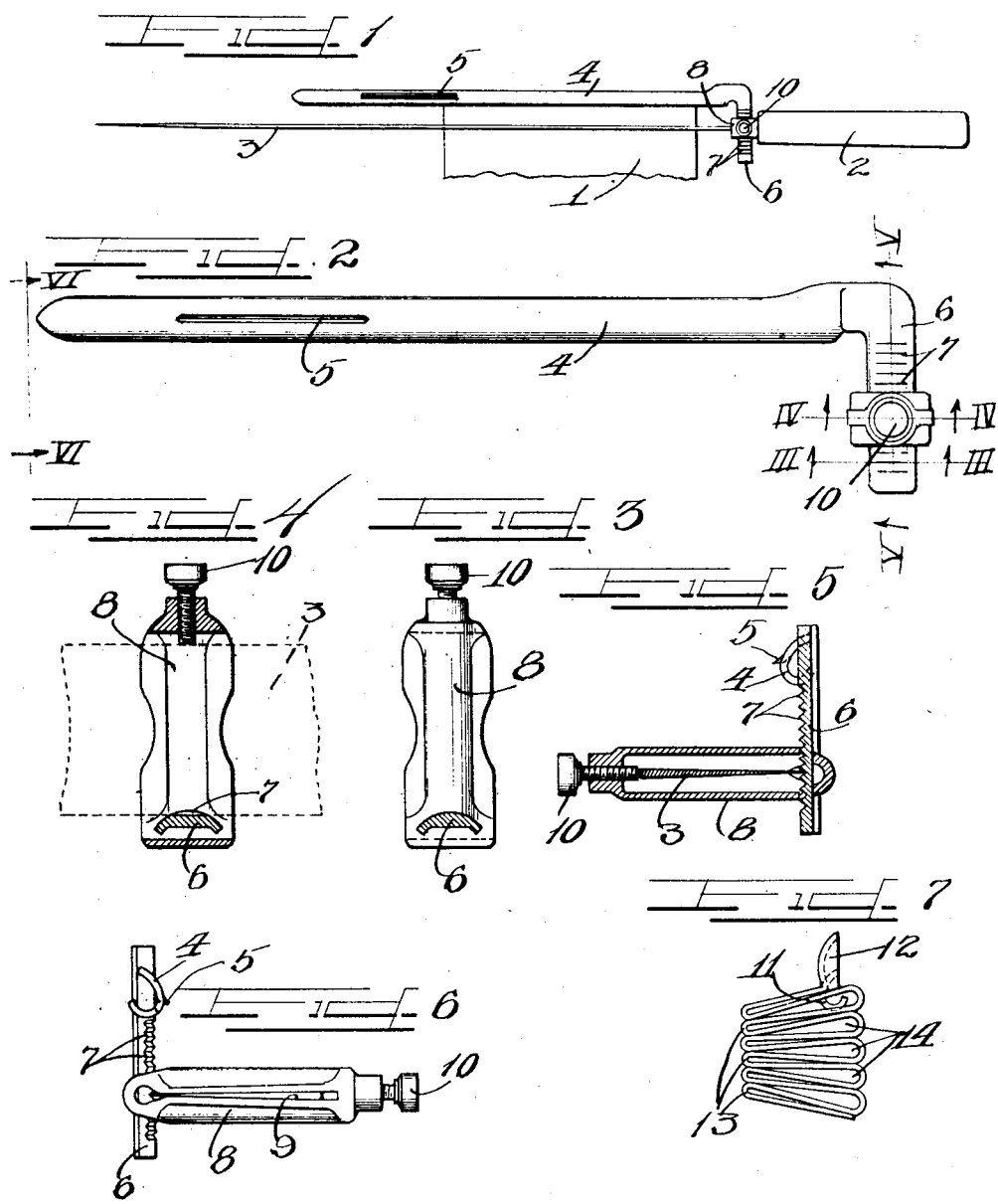

1,685,590

UNITED STATES PATENT OFFICE.

FRED A. LEIGH, OF CHICAGO, ILLINOIS.

CUTTER ATTACHMENT.

Application filed May 24, 1926. Serial No. 111,264.

This invention relates to a cutter attachment and more particularly to an attachment which is adapted to be removably engaged on the blade of a knife, and having a guide member spaced at a predetermined distance from one side of the knife blade to afford a means whereby the knife and the cutter attachment can cut uniform slices of any desired thickness from bread, cheese and different vegetables as desired.

It is an object of this invention to provide a simplified cabbage or vegetable cutter using an ordinary knife as a support for an adjustable guide bar to permit uniform slicing of an article.

It is also an object of this invention to provide a cabbage or vegetable cutter consisting of a guide member having a knife blade support for receiving the blade of an ordinary handle knife in different positions of adjustment so that different thicknesses may be cut from the cabbage or vegetable.

It is an important object of this invention to provide a cutter attachment having a paring blade struck therefrom, and also constructed with a support at one end adapted to permit the blade of an ordinary knife to be removably engaged therein to co-act with the guide member to permit slices of a uniform thickness to be cut from an article and furthermore permitting the knife blade to be adjusted with respect to the guide member so that the device may be readily adjusted for cutting slices from an article of any desired thickness.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a knife and the cutter attachment embodying the principles of this invention positioned in co-acting relation with an article to be sliced.

Figure 2 is an enlarged top plan view of a cutter attachment with a knife omitted.

Figure 3 is a sectional view taken on line III—III of Figure 2.

Figure 4 is a detailed section taken on line IV—IV of Figure 2 showing a portion of a knife blade in dotted lines.

Figure 5 is a detailed section taken on line V—V of Figure 2.

Figure 6 is an end view of the cutter attachment taken on line VI—VI of Figure 2.

Figure 7 is an end elevation of a modified form of cutter attachment.

As shown on the drawings:

The reference numeral 1 indicates a fragmentary portion of a loaf of bread, or a brick of cheese, or if preferred any other article which is to be uniformly sliced. The improved cutter attachment is adapted to be removably associated with an ordinary type of knife embracing a handle 2 and a cutter blade 3. The knife may be an ordinary table knife, a bread knife or a carving knife, which, as illustrated in Figure 1, affords a support for carrying the improved cutter attachment embodying the principles of this invention.

Figures 1 to 6 inclusive show a selected form of cutter attachment which comprises a metal guide bar 4 of a rounded or arc shaped cross section, and which is nickel plated or otherwise provided with a smooth finish. Struck longitudinally from the guide bar 4 is a paring blade 5 which may be used for peeling potatoes and the like. Integrally formed on one end of the guide bar 4 is an arm 6 which is also of an arc shape cross section having a row of teeth or grooves 7 formed thereon. Slidably engaged on the notched arm 6 is a metal shoe or frame 8 having a blade slot 9 formed therein through which the blade 3 of a knife is adapted to be slidably projected. A set screw 10 is adjustably supported on top of the shoe 8 with the inner end of the set screw adapted to engage against the upper edge of the cutter blade 3 to hold the cutting edge of the knife seated in one of the notches of the bracket arm 6. It will thus be seen that a knife blade 3 is adapted to be slidably projected through the adjustable slotted shoe 8 after which the shoe is adapted to be slidably adjusted on the arm 6 to space the blade a predetermined distance from the guide bar 4. When this has been accomplished the set screw 10 is turned to hold the blade locked in an adjusted position with respect to the notched or toothed arm 6. With the cutter attachment in position, as shown in Figure 1, the knife together with the cutter attachment may be applied to the loaf of bread 1 or to any other article which is to be uniformly sliced. By adjusting the shoe 8 on the arm 6 it will be seen that any thickness may be obtained. The device affords a means whereby cabbage, for example, may be readily and easily sliced with the slices of any desired thickness and all uniform. If preferred, the device may be used for slicing bread for making sandwiches and the like, or may be adjusted to slice cheese or vegetables.

Figure 7 illustrates a modified form of the invention comprising a metal guide bar 11 of arc shape or rounded cross section similar to the guide bar 4 and having a head 12 integrally formed on one end thereof. Rigidly secured or formed on the head 12, at right angles to the guide bar 11, is a heavy spring member 13 so shaped to afford a plurality of clamping pockets or recesses 14 between the different loops of the spring. In this construction a knife blade is adapted to be inserted into any one of the spring pockets 14 with the blade parallel to one edge of the guide bar 11. The handle of the knife blade may be used to hold the device so that bread, cheese or vegetables may be quickly and uniformly sliced. To obtain different thicknesses of cut the knife blade may be set in the various pockets 14 at different distances from the guide bar 11.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A cutter attachment comprising a metal guide bar, and means integrally formed on one end of said guide bar and provided with a plurality of grooves for removably receiving a knife with the blade of the knife seated in any one of said grooves at a predetermined distance from one side of the guide member.

2. A cutter attachment comprising a guide bar, an arm integrally formed at right angles thereto, teeth formed on said arm, a frame member slidably mounted on said arm and adapted to receive the blade of a knife projected therethrough, and a set screw carried by said frame adapted to engage the upper edge of the knife blade to hold the cutting edge thereof seated in a set position of adjustment between a pair of said teeth.

In testimony whereof I have hereunto subscribed my name.

FRED A. LEIGH.